(12) United States Patent
Koevoet et al.

(10) Patent No.: US 11,060,431 B2
(45) Date of Patent: Jul. 13, 2021

(54) PROCESS AND APPARATUS FOR REDUCING NOX EMISSIONS

(71) Applicant: Koninklijke De Vries Scheepsbouw B.V., Aalsmeer (NL)

(72) Inventors: Jan Koevoet, Aalsmeer (NL); Joost Van Willegen, Aalsmeer (NL); Jan H. Duyzer, Delft (NL); Juliana Garcia Moretz-Sohn Monteiro, Delft (NL)

(73) Assignee: Koninklijke De Vries Scheepsbouw B.V., Aalsmeer (NL)

( * ) Notice: Subject to any disclaimer, the term of this patent is extended or adjusted under 35 U.S.C. 154(b) by 0 days.

(21) Appl. No.: 16/618,467

(22) PCT Filed: May 30, 2018

(86) PCT No.: PCT/NL2018/050352
§ 371 (c)(1),
(2) Date: Dec. 2, 2019

(87) PCT Pub. No.: WO2018/222035
PCT Pub. Date: Dec. 6, 2018

(65) Prior Publication Data
US 2020/0116062 A1    Apr. 16, 2020

(30) Foreign Application Priority Data

May 30, 2017 (NL) ..................................... 2018994

(51) Int. Cl.
*F01N 3/00*    (2006.01)
*F01N 3/20*    (2006.01)
(Continued)

(52) U.S. Cl.
CPC ......... *F01N 3/2066* (2013.01); *F01N 13/009* (2014.06); *B01D 53/56* (2013.01);
(Continued)

(58) Field of Classification Search
CPC .. F01N 3/2066; F01N 3/0814; F01N 2570/14; F01N 2240/38; F01N 2590/02;
(Continued)

(56) References Cited

U.S. PATENT DOCUMENTS 6,231,824 B1    5/2001  Tseng et al.
7,214,356 B2 *  5/2007  Hsieh ..................... B01D 53/56
                                                  423/235
(Continued)

FOREIGN PATENT DOCUMENTS

DE    102013109129 A1    3/2014
EP        2711517 A1    3/2014
(Continued)

*Primary Examiner* — Jason D Shanske
(74) *Attorney, Agent, or Firm* — Banner & Witcoff, Ltd.

(57) ABSTRACT

The invention is directed to a process and apparatus for treating an off-gas from a lean burn engine comprising contacting said off-gas with an oxidizing compound, thus producing oxidized NOx compounds, followed by contacting the oxidized NOx compounds with water, by which at least part of said oxidized NOx compounds dissolves in said water. The process of the invention provides for a very efficient means of reducing NOx emission. The equipment for carrying out the process of the invention can be compact, so that it can be used on board without sacrificing too much valuable space and without increasing the weight of the ship too much.

12 Claims, 4 Drawing Sheets

(51) Int. Cl.
*F01N 13/00* (2010.01)
*B01D 53/56* (2006.01)
*B01D 53/94* (2006.01)
*F01N 3/08* (2006.01)

(52) U.S. Cl.
CPC .... *B01D 53/9418* (2013.01); *B01D 2258/012* (2013.01); *F01N 3/0814* (2013.01); *F01N 2570/14* (2013.01); *F01N 2610/02* (2013.01)

(58) Field of Classification Search
CPC .............. B01D 53/56; B01D 53/9418; B01D 2258/12; B01D 2251/104; B01D 2252/1035; B01D 2259/4566
USPC .......................................................... 60/286
See application file for complete search history.

(56) References Cited

U.S. PATENT DOCUMENTS 7,303,735 B2 * 12/2007 Suchak ................. B01D 53/60
                                                              423/210
8,865,098 B2 * 10/2014 Suchak ................. B01D 53/76
                                                              423/210

FOREIGN PATENT DOCUMENTS

| EP | 2719440 A1 | 4/2014 |
| KR | 101489657 B1 | 2/2015 |
| WO | 2015/092547 A2 | 6/2015 |
| WO | 2017043722 A1 | 3/2017 |

* cited by examiner

PROCESS AND APPARATUS FOR REDUCING NOX EMISSIONS

RELATED APPLICATIONS

This application is a National Stage Application under 35 U.S.C. 371 of co-pending PCT application PCT/NL2018/050352, filed May 30, 2018 and NL application no. 2018994, filed May 30, 2017 each of which are hereby incorporated by reference in their entireties.

BACKGROUND OF THE INVENTION

The invention is in the field of air pollution control. In particular the invention is in the field of the reduction of NOx emissions originating from marine engines, in particular lean burn engines, such as diesel-fueled engines as used in yachts, as well as in other ships.

The term "NOx" is used for mono-nitrogen oxides, in practice mainly NO (nitric oxide) and $NO_2$ (nitrogen dioxide). NOx is produced during combustion, especially at high temperature and causes environmental problems, such as acid rain and photochemical smog. In the past decades NOx emissions have been successfully reduced by various techniques. Until now these known techniques have not been successfully applied, at least not on a large scale and not over the full power range, for the treatment of exhaust gases from marine engines, in particular from yacht engines.

The International Maritime Organization, IMO has produced regulations for NOx control requirements. In recent years the maximum allowable NOx emissions have been gradually decreased from Tier I (for ships constructed after 1 Jan. 2000): 9.8 g NOx per kWh, via Tier II (for ships constructed after 1 Jan. 2011): 7.7 g NOx per kWh, to Tier III (for ships constructed after 1 Jan. 2016): 2 g NOx per kWh. In the near future Tier IV legislation is expected, in which the maximum emission is as low as 0.4 g NOx per kWh. The indicated maximum emissions are for engines operating at 2000 rpm. Furthermore Regulation (EU) 2016/1628 imposes new emissions limits, referred to as 'Stage V', to reduce the emissions of air pollutants, such as NOx.

One known NOx abatement technique comprises exhaust gas recirculation (EGR). This requires modifications of the engines and corresponding extensive development and testing. Also these modified engines are not always suitable for use in yachts, in particular in view of the limited space for engines on board of these yachts.

Other techniques that are normally used for lean burn engine exhaust NOx abatement involve selective catalytic reduction (SCR) of NOx by the addition of reducing agents, such as urea $((NH_2)_2CO)$. Again this technique would be less desirable for luxury yachts since it would require large sacrifices of valuable space. In addition, reducing agents such as urea need to be stocked in sufficient amounts, which increases the weight of the ship considerably and this results in higher emissions, including higher $CO_2$ emissions, which is undesirable from an environmental point of view.

Furthermore, SCR techniques only work in a limited temperature range and are for instance not effective at lower temperatures, e.g. at temperatures below 250° C.

U.S. Pat. No. 6,231,824 discloses a process for removal of NO from a gas stream by contacting the gas stream with oxygen at a temperature of 150-1000° C. with a metal-exchanged zeolite, by which NO is oxidized to $NO_2$, followed by contacting the resulting gas stream with ozone, thereby converting the $NO_2$ to form $N_2O_5$ and optionally nitric acid, then contacting the gas stream with an aqueous liquid, thereby scrubbing the nitric acid and/or precursors thereof. The aqueous liquid used as scrubbing agent preferably has a pH greater than 7.

EP2711517 discloses a device for eliminating nitrogen oxide from exhaust gases, which comprises a reformer device. In the reformer device nitrogen oxide is catalytically converted into nitric acid using ozone, followed by absorption in a liquid. The catalyst used for this purpose is based on zeolites, which are optionally exchanged with Ag, Fe or Cu ions. Depending on the type of catalyst the amount of NOx removed is highest in the range of 100° C. to 250° C. Non-catalytic reaction of nitrogen oxides with ozone is not suggested.

The apparatus described in DE102013109129 converts nitrogen oxides from off-gas into nitric acid, which is subsequently absorbed in a liquid such as water, alkaline solution, or an ionic liquid. A particulate filter (DPF) is used as catalytic converter by which NO is oxidized to $NO_2$ and it is suggested that a higher temperature results in high $NO_2$ concentrations. Cooling the off-gas before it enters the catalytic converter is not suggested.

WO2015092547 discloses a method for removing nitrogen oxides from gas streams by scrubbing with seawater and then adding ozone to remove the contaminants.

EP2719440 discloses a method for removing contaminants from a process gas stream comprising adding ozone to one or more portions of the process gas stream and feeding these to a capture device, in particular to a scrubbing apparatus.

KR101489657 describes a method of reducing nitrogen oxide and sulfur oxide contained in exhaust gas discharged from a diesel engine for a ship, which involves injecting a liquid catalyst.

An object of the present invention is to provide a method for NOx emission control of exhaust gases from lean burn engines, in particular marine engines, which does not suffer from the disadvantages mentioned above.

BRIEF SUMMARY OF THE INVENTION

In accordance with the invention, there is provided a process for treating an off-gas from a lean burn engine comprising contacting said off-gas with an oxidizing compound, thus producing oxidized NOx compounds, followed by contacting the oxidized NOx compounds with water, by which at least part of said oxidized NOx compounds dissolves in said water.

This process of the invention provides for a very efficient means of reducing NOx emission. The equipment for carrying out the process of the invention can be compact, so that it can be used on board without sacrificing too much valuable space and without increasing the weight of the ship too much.

The present invention is based on the finding that by subjecting the NOx compounds present in the exhaust gas to an oxidation step, followed by contact with water, the oxidized compounds readily dissolve.

DETAILED DESCRIPTION OF THE INVENTION

The present invention is based on the notion that the solubilities of $NO_2$ and $N_2O_5$ in water are much higher than the solubility of NO in water. NO can be oxidized to $NO_2$ using oxygen present in the exhaust gas (lean-burn engines burn fuel with an excess of air and thus oxygen ends up in the exhaust gas). NO and $NO_2$ can be oxidized respectively to $NO_2$ and $N_2O_5$ by ozonation and, due to the presence of water in gas, for nitric and nitrous acid.

Thus, the present invention provides treatment of removal from nitrogen oxides by a combination of a catalytic convertor and non-catalytic ozone reaction. By this combination excellent conversion into water soluble species can be obtained, while a versatile process control is possible, in particular because the temperature of the process steps can be controlled by injection of water.

Of importance is that the process of the invention can be used when the off-gases are still cold, which is important for instance at a cold start (which for luxury ships often takes place in a built-up area, for instance in a marina). Also when luxury ships are slowly maneuvering they are often in the vicinity of people and it is therefore important that adequate NOx removal is possible. This would not be possible with most prior art deNOx systems, such SCR based systems, because these have a very limited temperature window in which they are effective.

The oxidation of NO to $NO_2$ is an equilibrium reaction, which takes place as follows:

$$2NO+O_2 \rightleftharpoons 2NO_2 \tag{I}$$

Figure 3:
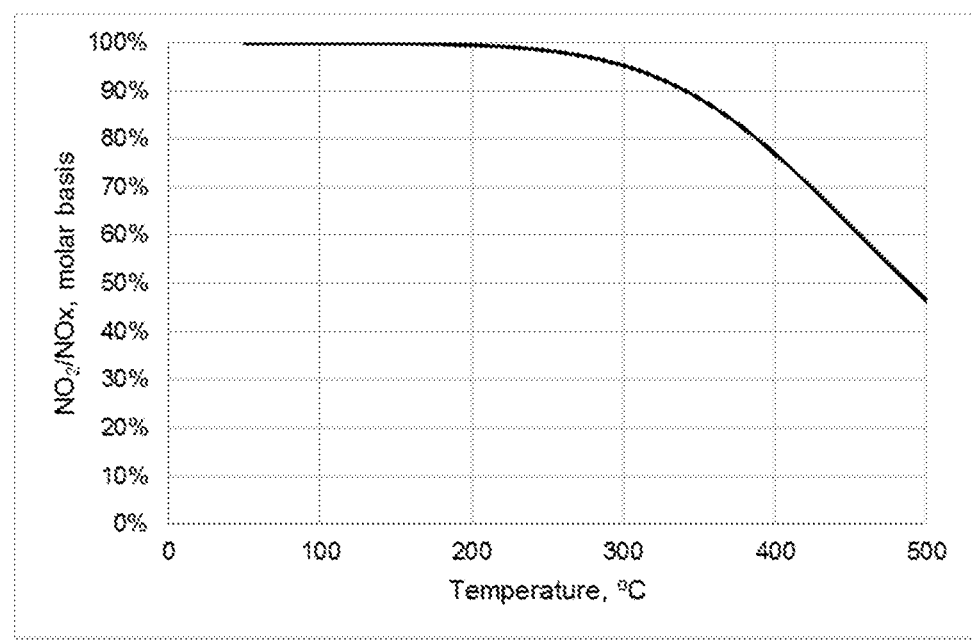
FIG. 3 is a graph showing the equilibrium between NO and $NO_2$ as a function of temperature.

In FIG. 3 the equilibrium composition as function of the temperature is given. It follows that when the exhaust gases are hot, typically in the range of 300-600° C., NO is oxidized by oxygen to $NO_2$. This reaction can be catalyzed by using an NO oxidation catalyst. Such catalyst can be based, e.g. on noble metals such as Pt and Pd or based on other metals, such as Co and Mn. In this way part of the NO present in the exhaust gas can be converted into $NO_2$.

However, when the exhaust gases are not hot enough, in particular in the range of 50-300° C., these low temperatures and the thermodynamics of Reaction a) prohibit an acceptable reduction of NO levels. The present inventors realized that the NO concentration in the lower temperature range can be reduced in a practical setup by treating the NOx containing exhaust gas stream with an oxidizing compound such as ozone. The ozonation reactions are as follows:

$$NO+O_3 \rightarrow NO_2+O_2 \tag{II}$$

$$2NO_2+O_3 \rightarrow N_2O_5+O_2 \tag{III}$$

$$N_2O_4+O_3 \rightarrow N_2O_5+O_2 \tag{IV}$$

Ozone is thermally unstable at temperatures above 120° C. Therefore, a temperature control step by water injection is included in the process, before the ozone injection. In this way, the temperature can be lowered to 60-100° C. In this way NO is converted into $NO_2$, $N_2O_4$ and $N_2O_5$. Because these species are is reactive with water, the water solubility of the combined NOx compounds increases.

When NOx is dissolved in water, the following reaction occurs:

$$2\ NO_2+H_2O \rightarrow HNO_2\ \text{(nitrous acid)}+HNO_3\ \text{(nitric acid)} \tag{II}$$

$$N_2O_4+H_2O \rightarrow HNO_2\ \text{(nitrous acid)}+HNO_3\ \text{(nitric acid)} \tag{III}$$

$$N_2O_5+H_2O \rightarrow 2\ HNO_3\ \text{(nitric acid)} \tag{IV}$$

Both nitrous and nitric acid are relatively strong acids, so they will be in their dissociated forms: $NO_2^-$ (nitrite) and $NO_3^-$ (nitrate). Both anions are already present in natural seawater, typically in amounts of several $mg/dm^3$.

In accordance with the invention nitrous and nitric acid are formed in a late stage of the process, by carrying out the scrubbing step after a high conversion into water soluble species is effected. This means that corrosion problems can be limited, in any case to the scrubber section, which can be specifically designed for this purpose.

Temperature control is an important aspect of the present invention, in particular of the gas stream after the first (catalytic) conversion step. Preferably the gas stream is controlled to a temperature of 300-500° C. If the gas stream needs to be cooled in this step, cooling is suitably carried out by injecting water, such as sea water or sweet water.

By carrying out the reaction with ozone in a non-catalytic reactor, no contact of the gases with a catalyst is required. Surprisingly, the reaction with ozone is kinetically fast enough to obtain adequate conversion with the residence times (GHSV) that can be achieved in a practical setup, in particular on board of a ship, in particular of a luxury ship were space constraints are very severe. Also problems normally associated with heterogeneous catalysis, such as clogging of monolith channels and/or high pressure drop are avoided.

The water used for scrubbing the $NO_2$ can be seawater or sweet water, dependent on where the ship is. In most cases the water will be seawater and seawater is preferred.

Figure 1:
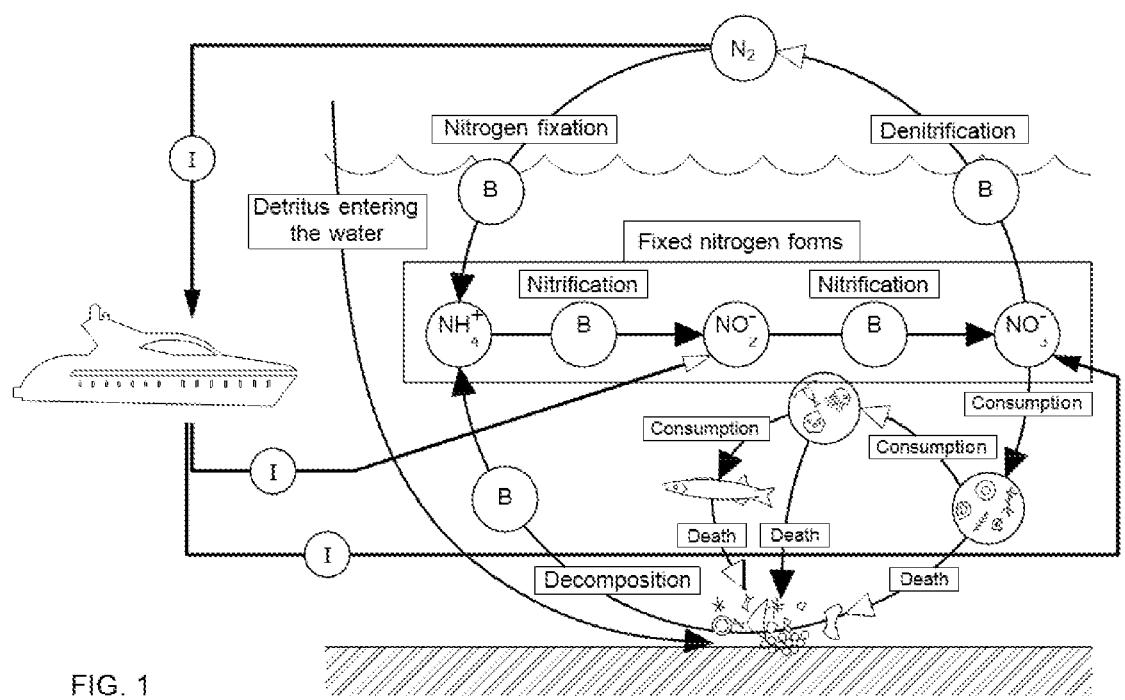
FIG. 1 shows schematically how the process of the invention is integrated in the natural nitrogen cycle.

Thus, in accordance with the present invention NOx is converted to nitrite ($NO_2^-$) and nitrate ($NO_3^-$). These are fixed nitrogen forms, which also occur naturally in surface water, such as seawater and are an important part of the nitrogen cycle. The marine nitrogen cycle, schematically depicted in FIG. 1, is the equilibrium between nitrogen, present in the atmosphere as a gas ($N_2$), and its fixed forms (ammonium, nitrite and nitrate). The process of the invention adds nitrogen to this cycle, as indicated by the arrows marked with 'I' in FIG. 1. Bacteria present in the ocean (indicated by 'B' in FIG. 1) are responsible for nitrogen fixation, and thus for making nitrogen available in a form in which it can be consumed by other forms of life. Nitrogen is essential for growth and reproduction for both plants and animals. It is an important element of amino acids that are the building blocks for proteins, as well as in nucleic acids (DNA and RNA). The process of the invention is a process of human-induced nitrogen fixation.

In harbor cities, ship emissions are in many cases a dominant source of urban pollution. Furthermore, emissions of NOx from ships may be transported in the atmosphere over several hundreds of kilometers, and thus can contribute to air quality problems on land, even if they are emitted at sea. This pathway is especially relevant for deposition of nitrogen compounds in freshwater bodies. Excessive nitrogen input in freshwater bodies may cause a dense growth of algae and plant life, known as eutrophication. Therefore, control of NOx emissions to the atmosphere will have beneficial impacts on air quality and eutrophication.

In accordance with the invention a transfer takes place of the fixed nitrogen species from atmosphere, where this species hinder air quality and impact human health, to the marine environment, where it is taken up in the natural nitrogen cycle. The amount of nitrogen that is added to the natural nitrogen cycle is negligible.

All the steps required for the invention can be carried out on existing or new ships with minor modifications to these ships.

For instance, ozone may be generated on board by known techniques, for instance using commercially available ozone generators. Typically these are fed with either air or an oxygen rich gas, typically comprising 90 vol. % or more O2. The oxygen rich gas can be made on board from air, for instance using pressure swing adsorption (PSA).

The contacting of the treated gas stream to dissolve the $NO_2$ compounds can be done by injecting water in the exhaust gas stream. This also cools the gas stream. The exhaust gas pipe discharges under water, as is common for yachts. The present inventors found that the residence time normally available in exhaust pipes on ships is sufficient to remove the soluble NOx forms, in particular $NO_2$ and $N_2O_5$ from the exhaust gas of an engine operated at maximum load. To increase mass transfer rates in the step of dissolving $NO_2$ preferably the water is sprayed into the exhaust gas. Droplet size of the sprayed water are preferably in the range of 10-100 μm, more preferably 20-90 μm.

The exhaust gas can also be fed to a gas scrubber, which is typically filled with packings, such as Raschig rings, in which scrubber the gas is contacted with water, which is distributed therein. The water loaded with $NO_2$ may then be discharged in the surface water.

Figure 2:
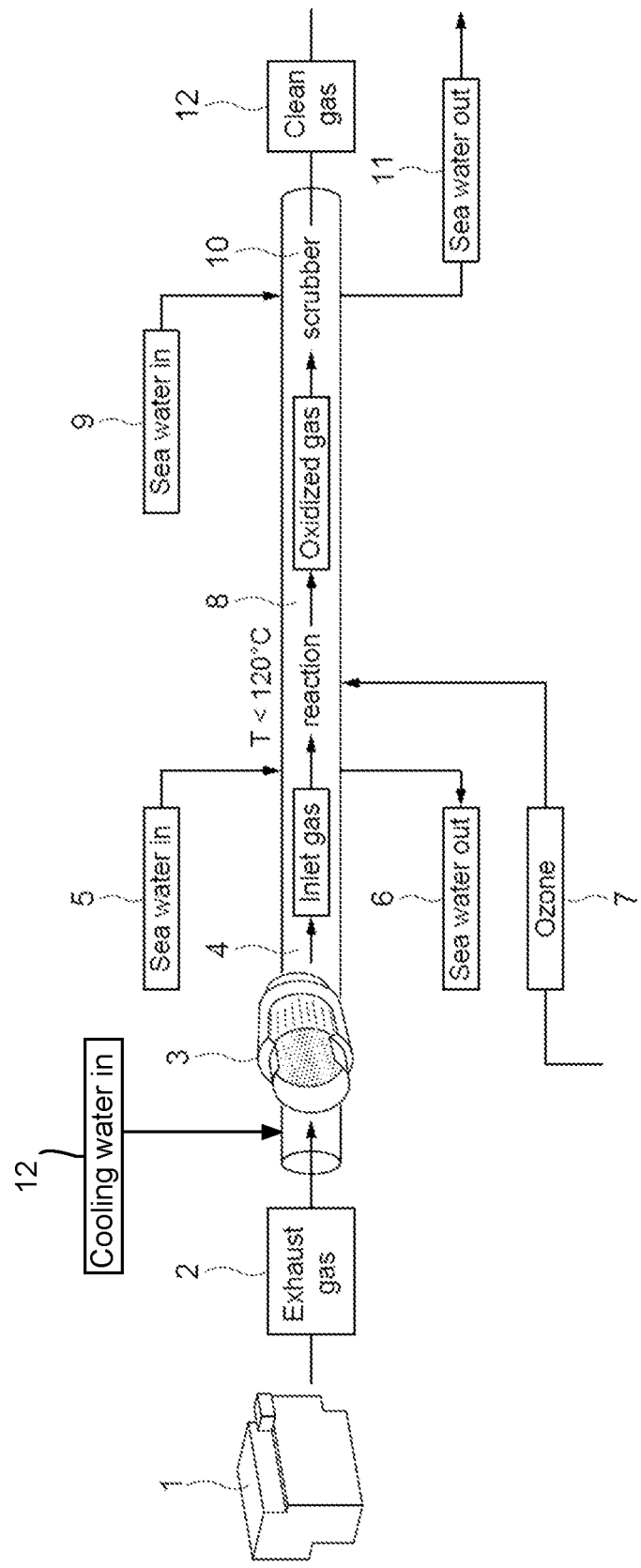
FIG. 2 is a schematic representation of a possible embodiment of a process according to the invention.

In FIG. 2 a schematic representation is given of a typical process according to the invention. On board of most yachts two engines are present and the exhaust gas treatment is also carried out in duplicate.

Engine (1) produces exhaust gas (2), which typically contains NO 80-95 wt. %, e.g. about 90 wt. %, expressed as fraction of total NOx. The $NO_2$ fraction of the NOx stream is then about 10 wt %. This stream (2) is fed to catalytic NO converter (3), in which NO is oxidized to $NO_2$ using oxygen present in the exhaust gas. The temperature of exhaust gas (2) may vary widely and is typically 100-600° C. The product gas (4) is cooled by injecting water (5), which is mostly evaporated. A stream of gas comprising an oxidizing compound, such as ozone (7) is then fed to the cooled gas stream. Because the gas stream is cooled to a temperature of around 100 to 140° C., preferably less than 120° C., ozone can be used (ozone is not stable at temperature above around 150° C.). The reaction with ozone takes place in the gas phase and the GHSV (Reactant Gas Flow Rate/Reactor Volume) can be for instance 500 to 80000 $h^{-1}$, preferably from 1000 to 50000 $h^{-1}$, more preferably from 2000 to 25000 $h^{-1}$. This reduces the NO content further, so that the gas stream (8) contains less than 10 wt. % NO and more than 90 wt. % $NO_2$ (based on total NOx).

Next water (9) is added in scrubber section (10), typically by spraying small droplets of water, preferably having a size in the range of 10-100 μm, more preferably 20-90 μm. The water is collected in stream (11) and discharged. The clean gas is also discharged, typically under the water surface.

A further advantage of discharging the off-gases under the water surface is that particulate matter (PM; viz. small particles, typically less than 10 μm in diameter) will then also be contained in the water, where it will eventually be broken down, so that it is prevented from entering the atmosphere. PM emissions are of increasing concern, since they are considered to have adverse effects on human wellbeing and also may cause environmental damage.

The process of the present invention can be controlled so as to obtain the desired level of NOx removal.

Adequate process control can be achieved for instance by controlling the amount of ozone to the non-catalytic convertor, based on the $NO_2$ content of the gas stream exiting the non-catalytic convertor.

Other means for process control are measuring the temperature directly after the catalytic convertor and using that temperature for controlling the flow rate of cooling water (5). In other embodiments, cooling water 12 may be injected into exhaust gas 2 after it exits engine 1 and before it enters catalytic converter 3.

It is also possible to control the amount of sea water (9) that is used for scrubbing by the NOx concentration of the gas exiting the non-catalytic convertor. This is important to prevent that too much seawater is taken in, which may cause backpressure problems for the engine system (typically the backpressure should be 85 mbar or less).

An important advantage of the present invention is that even if not all oxidized nitrogen oxides are removed in scrubber (10), this generally does not result in problems, since the off-gas is discharged below the water line.

EXAMPLE

A luxury yacht equipped with two diesel-fueled propulsion engines of 1140 kW is taken as an example. This yacht must comply with IMO tier III emission regulation, and emit a maximum of 2.06 g/kWh of NOx, which is currently only possible by using an SCR system. However, it should be noticed that the IMO test cycles cover the engine load range from 25% to 100%.

Figure 4:
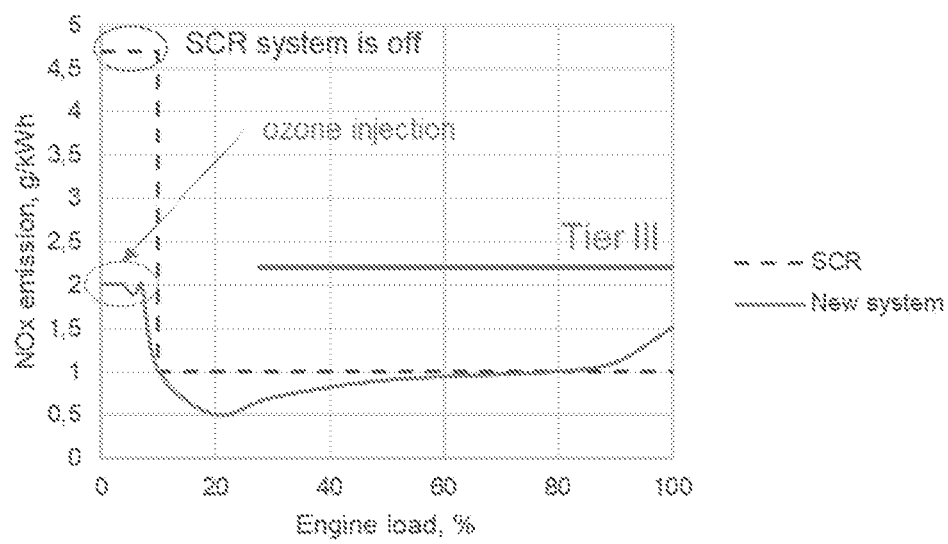
FIGS. 4 and 5 show experimental NOx emissions as a function of engine load.

The SCR system is designed to work at exhaust gas temperatures above 250° C., which for the example vessel is achieved at engine loads above 10%. Therefore, the SCR system will be off (i.e., no urea will be injected) until the load reaches 10%, and the emissions from the engine will be uncontrolled, as can be seen in FIG. 4. When the temperature is above 250° C., urea is injected and the NOx emissions are regulated to a maximum of 1 g/kWh, according to the SCR system design.

In contrast, the system according to the invention can be used to control the NOx emissions to below 2 g/kWh in the full range of engine operation. While the exhaust gas temperature is low, this is achieved by using the water injection system (see FIG. 2, reference numeral 5) to cool the gas to about 100° C. (if necessary) and subsequently dosing ozone (7 in FIG. 2) to the gas. Once the temperature is higher than 250° C., the ozone generator may be turned off, and the catalytic oxidation step regulates the NOx emissions.

Hence, the system of the invention is an improved solution as compared to SCR. This is particularly true for superyachts, which tend to operate at low engine load from 60% to 90% of the time. In other words, a superyacht equipped with SCR may uncontrollably emit NOx for 60-90% of the time. Moreover, the total weight of the system of the invention may be as low as 3 tonnes, as compared to 10 to 15 tonnes for an SCR system. The total volume required by the system of the invention is 8 $m^3$, as compared to 17 to 27 $m^3$ for an SCR system.

Figure 5:
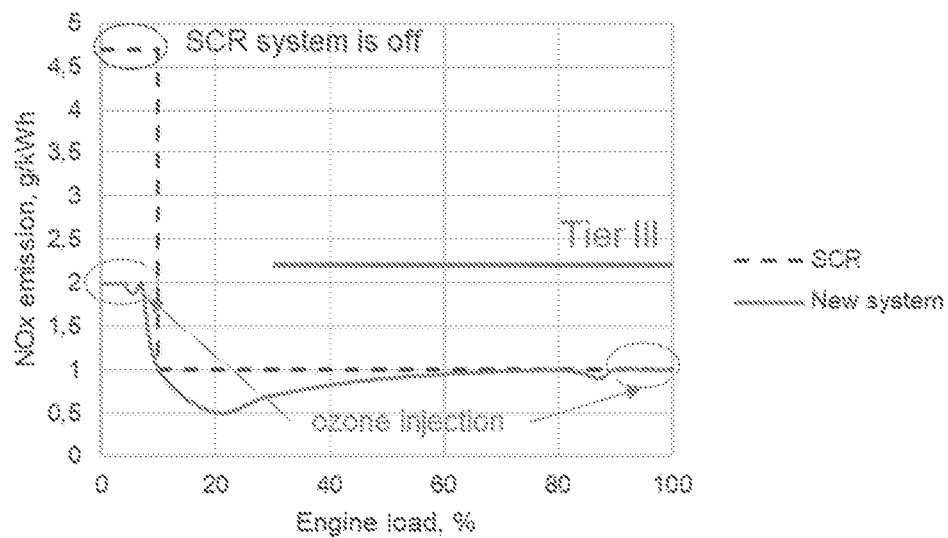

Due to the flexibility of the system proposed herein, the ozone system may also be used when the exhaust gas temperature is high, to control increased emissions in the load range above 85%, as can be seen in FIG. 5.

The invention claimed is:

1. A process for treating an off-gas from a lean burn marine engine comprising:

treating said off-gas in a catalytic converter by which NO is oxidized using oxygen present in said off-gas to $NO_2$, followed by cooling said off-gas using water injection, followed by contacting said treated off-gas with ozone, thus producing oxidized $NO_x$ compounds at least in part in a non-catalyzed reaction, followed by contacting the oxidized $NO_x$ compounds with water, by which at least part of said oxidized $NO_x$ compounds dissolves in said water, wherein said water for cooling and dissolving oxidized $NO_x$ compounds is seawater or sweet water.

2. The process according to claim 1, wherein said ozone is injected in a stream of said treated off-gas.

3. The process according to claim 1, wherein said contacting of said treated off-gas with ozone is carried out at a temperature of 60-140° C.

4. The process according to claim 1, wherein said off-gas coming from said engine is cooled to a temperature of 300-500° C. before treating said off-gas in the catalytic converter.

5. The process according to claim 1, wherein said contacting of said treated off-gas with ozone is carried out at a GHSV of 500 to 80000 $h^{-1}$.

6. The process according to claim 1, wherein water in in which at least part of said oxidized $NO_x$ compounds are dissolved is discharged in surface water.

7. An apparatus for reducing $NO_x$ emissions from engines in ships having lean burn engines, comprising a catalytic converter and an ozone generator which produces ozone that can be contacted with an exhaust gas produced by a lean burn engine in an ozone/exhaust gas contacting zone, which contacting zone discharges in a scrubber zone, which comprises a water sprayer for adding water to the scrubbing zone and a water discharge for discharging water containing dissolved oxidized $NO_x$, further comprising an injection point to inject water in the exhaust gas for cooling a temperature of the exhaust gas after it exits said catalytic converter and before it enters said ozone/exhaust gas contacting zone, wherein seawater or sweet water is provided for the water distribution means and the water injection.

8. The apparatus according to claim 7, comprising a further injection point to inject cooling water in the exhaust gas after it exits the engine and before it enters said catalytic converter and comprising a temperature control loop to adjust the temperature of the exhaust gas to a desirable level before it enters said catalytic converter.

9. The apparatus according to claim 8, wherein the temperature of the exhaust gas before it enters said catalytic converter is adjusted by the cooling water to 300-500° C.

10. The process according to claim 1 wherein the water for cooling is seawater.

11. The process according to claim 1, wherein said off-gas coming from said engine is cooled to a temperature of 300-500° C. by injecting water before treating said off-gas in the catalytic converter.

12. The apparatus according to claim 7 wherein the seawater is provided for the water sprayer and the water injection.

* * * * *